United States Patent [19]
Freund

[11] Patent Number: 6,021,990
[45] Date of Patent: Feb. 8, 2000

[54] INTEGRATED LEAD SCREW DRIVE FOR SEAT ADJUSTER

[75] Inventor: Roger Freund, Port Sydney, Canada

[73] Assignee: Meritor Automotive Canada, Inc., Bracebridge, Canada

[21] Appl. No.: 09/123,681

[22] Filed: Jul. 28, 1998

[51] Int. Cl.[7] .................................................. F16M 13/00
[52] U.S. Cl. ........................................................ 248/429
[58] Field of Search .................................. 248/429, 430; 296/65.13, 65.12, 65.01

[56] References Cited

U.S. PATENT DOCUMENTS

| | | | |
|---|---|---|---|
| 2,278,101 | 3/1942 | Browne | 248/430 |
| 2,758,872 | 8/1956 | Solomon et al. | 296/65.12 |
| 2,964,093 | 12/1960 | Lohr et al. | 248/429 |
| 2,966,069 | 12/1960 | Wise | 248/429 X |
| 5,741,000 | 4/1998 | Goodbred | 248/430 |

*Primary Examiner*—D. Glenn Dayoan
*Assistant Examiner*—Patricia Gale
*Attorney, Agent, or Firm*—Howard & Howard

[57] ABSTRACT

A seat adjustment assembly for driving a vehicle seat forwardly and rearwardly within a cab of a vehicle includes a pair of lead screws which are driven by cables from a single motor. The lead screws engage a nut runner, and the nut runner is fixed to the lower track. The lead screws are fixed to the upper track, and when the lead screws rotate, the nut runner causes the lead screw to move axially. This thus causes the upper track relative to the lower track, and move the seat. The adjustment assembly is a modular unit which can be attached as an pre-assembled to the remainder of the vehicle seat. The housings incorporated into this arrangement are staked together, such that separate retaining members such as bolts are eliminated.

7 Claims, 3 Drawing Sheets

6,021,990

INTEGRATED LEAD SCREW DRIVE FOR SEAT ADJUSTER

BACKGROUND OF THE INVENTION

This invention relates to an improved lead screw drive for adjusting the position of a vehicle seat.

Modern vehicle seat assemblies often have motors to drive the seats between several positions. Motors are provided for changing the vertical position and the tilt of the seat, and also for changing the position of the seat towards and away from the instrument panel to accommodate various sized drivers.

The motors for driving the seats forward and rearwardly within the cab, have often been relatively complex and expensive. Typically, lower slides are fixed to the vehicle floor at each side of the seat, and second upper slides are fixed to the seat and ride within the first lower slides.

A single central motor is used for driving both sides. The known single central motor includes a motor having cables extending to each of the sides. The cables drive a gear reduction which in turn drives a second cable that then drives a member for moving the seat forward and rearwardly.

This arrangement has been relatively complex, and labor intensive at the assembly stage. It has been difficult to provide such a system in modular components, and further the arrangement has required a good number of attachment members for each of the several components.

It is a desire of the present invention to reduce the complexity of the drives for moving the seats forwardly and rearwardly in the cab.

SUMMARY OF THE INVENTION

In a disclosed embodiment of this invention, a single motor drives cables extending to each side of a seat assembly. The cables drive a worm gear which in turn engages a gear on a shaft. The shaft is constrained from moving axially relative to the upper slide. The shaft drives a runner nut, fixed to the lower slide. When the lead screw is driven by the worm gear, the runner nut moves axially relative to the lead screw. However, since the runner nut is fixed to the lower slide, the end result is that the lead screw, and hence the entire motor assembly, is driven axially relative to the lower slide. The lead screw is fixed to the upper slide, such that upon this movement the upper slide, and hence the seat, move axially.

The worm gear is preferably enclosed in a housing which snaps together such that no separate attachment members are necessary. In addition, cable housings are snapped to the motor housing, again to reduce the complexity of the overall assembly. The motor is preferably attached to the other seat assembly portions, not by separate retaining members, but by simply snapping onto the seat as a modular assembly. The inventive assembly thus eliminates separate bolts, screws, etc. Further, the inventive assembly may be attached as a single modular assembly. Again, this reduces the complexity of the assembly.

In summary, the overall arrangement provides a seat horizontal adjustment assembly which can be provided in modular components, and which can be quickly assembled to the seat assembly as a single assembly. This is an improvement over the prior art.

In a method of assembling the present invention, the seat horizontal adjustment assembly can be simply slid into the remainder of the seat adjustment assembly. Only two members, the nut retainer and an end bracket, must be bolted to the lower and upper slides, respectively. The remainder of the unit need not be attached by separate retainers, but snaps on to a rod with the motor attachment brackets.

These and other features of the present invention can be best understood from the following specification and drawings.

DETAILED DESCRIPTION OF THE PREFERRED EMBODIMENT

Figure 1:
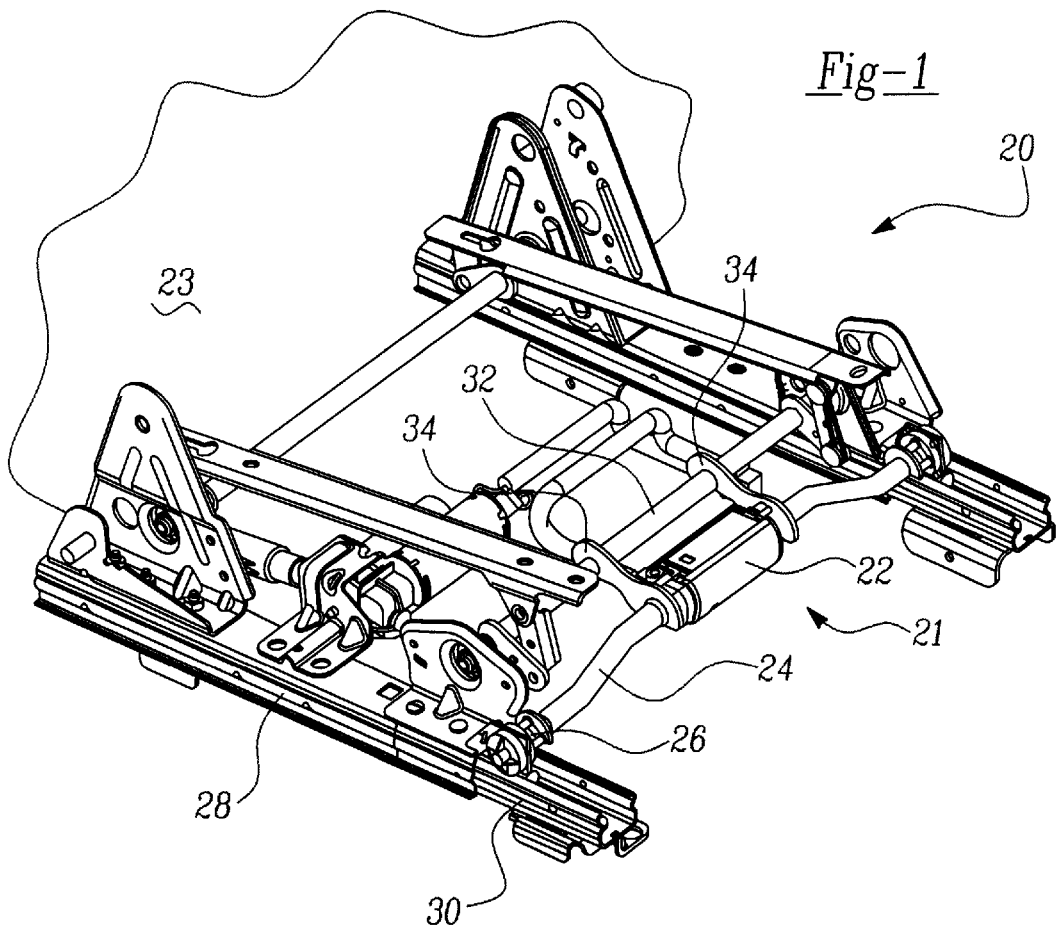
FIG. 1 shows the assembled inventive seat adjustment structure.

FIG. 1 shows a seat assembly 20 incorporating a horizontal assembly 21 for driving the seat forwardly and rearwardly within the vehicle cab. As shown in phantom at 23, a seat sits above this assembly, and is driven forwardly and rearwardly within a cab of a vehicle by the assembly 21. Cable housings 24 extend to both sides of the seat assembly, and receive cables, as known.

The cables drive a gear within a gear housing 26 to move an upper track or slide 28 forwardly within the cab relative to a lower track or slide 30.

As is generally known in this industry, the upper track is typically fixed to the seat, while the lower track is fixed to the vehicle floorboard.

A crossing rod 32, which forms a portion of an adjustment structure for adjusting the seat vertically, receives brackets 34 from the motor 22.

In assembling the assembly 21 to the remainder seat assembly, lead screws 36, discussed below, are inserted between the upper and lower tracks 28 and 30. The brackets 34 then snap onto rod 32. Two minor connections need then be made between the upper 28 and lower 30 tracks and the assembly 21 This will be explained below with reference to FIGS. 6A and B.

The connections will be better understood from the following drawings. However, it is clear that the attachment of the drive 21 to the overall set adjustment assembly 20 has been greatly reduced by this assembly.

Figure 2:
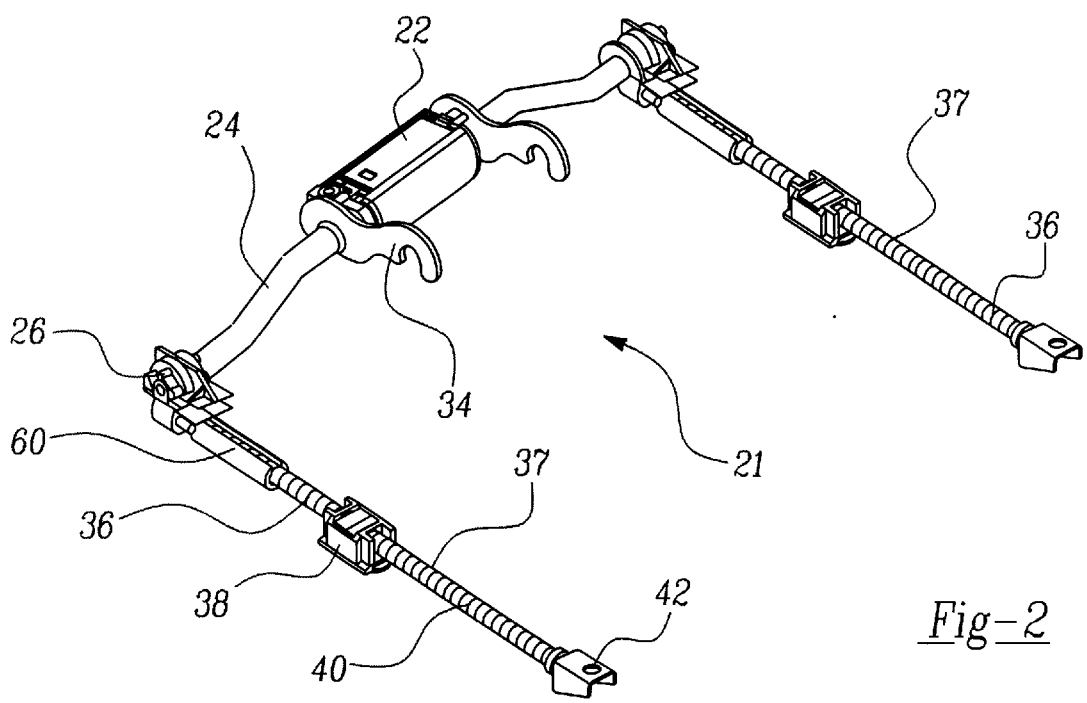
FIG. 2 is a view of the modular structure for driving the seat forwardly and rearwardly.

As shown in FIG. 2, the modular adjustment assembly 21 includes the motor 22, the cable housings 24, the gear housings 26 and the brackets 34. Lead screws 36 are threaded on an outer periphery 37, and receives a nut 38. Nut 38 includes an internal thread which rides along the threads 37 on the lead screw 36. A portion 40 of the lead screw 36 is shown on one side of the nut 38. As will be better understood from the following description, the nut 38 is fixed to the lower slide 30, while an end bracket 42 of the lead screw is fixed to the upper track 28. Lead screw 36 is driven by an assembly within the gear housing 26, and rotates. The lead screw 36 rotates within the nut 38, and the nut which is restrained against rotation then moves axially relative to the lead screw. Since the nut 38 is fixed, the result is that the lead screw 36, the upper track 28 and the seat 23 move. A stop 60 and end bracket 42 define the amount of adjustment of the upper 28 and lower 30 tracks relative to each other.

When the lead screw 36 moves relative to the nut 38, the upper track 28 is driven relative to the lower track 30. Thus, the seat 23 moves along, as known.

Figure 3:
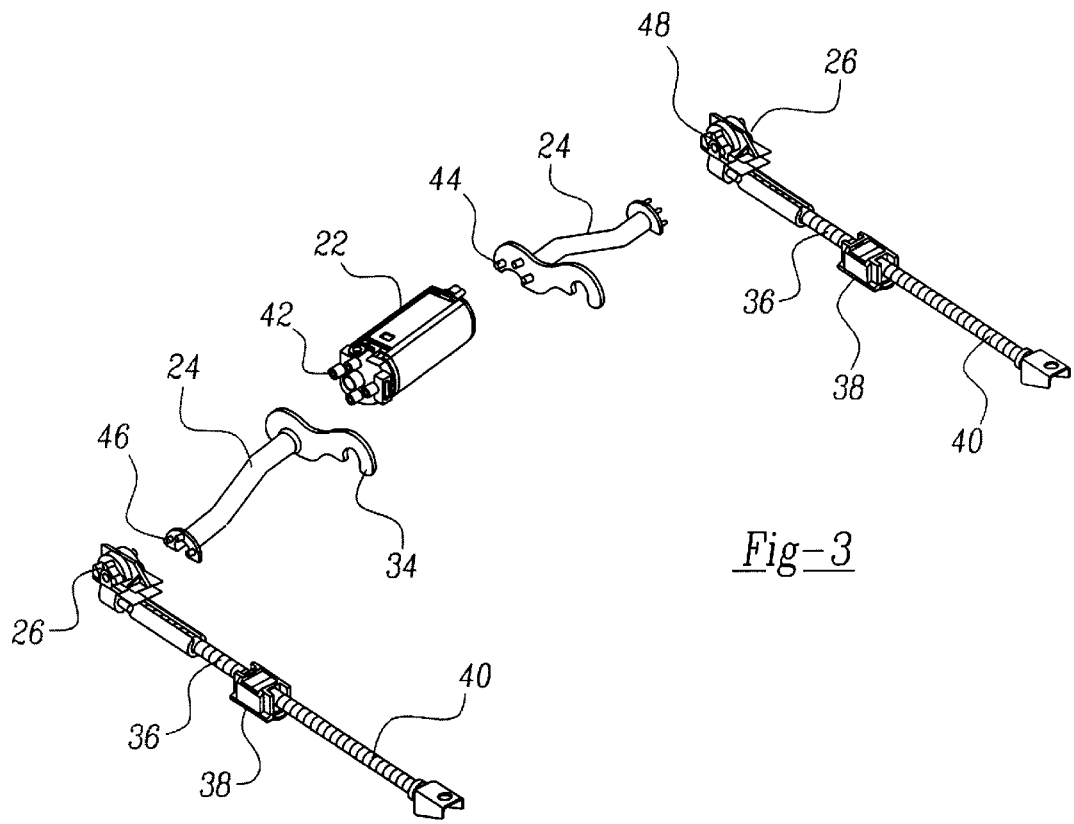
FIG. 3 is an exploded view of the components of the assembly shown in FIG. 2.

As can be seen in FIG. 3, the motor housing 22 includes openings 42 which receive pins 44 from the cable brackets 20. These pins allow the quick attachment of the cable housings to the motor housing 22. Similarly, pins 46 are formed at the cable bracket at the opposed end and are received within openings 48 in the gear housings 26. The pins 44, 46 are force fit into the respective openings. This facilitates the modular assembly of the several components, such that they may be quickly attached. It should be understood that when the cable housings 24 are attached to the motor housings 22 and gear housings 26, the connections also provide a drive connection to a cable, not shown, received within the cable housing 24. Known cable connections are used to complete this attachment.

Figure 4:
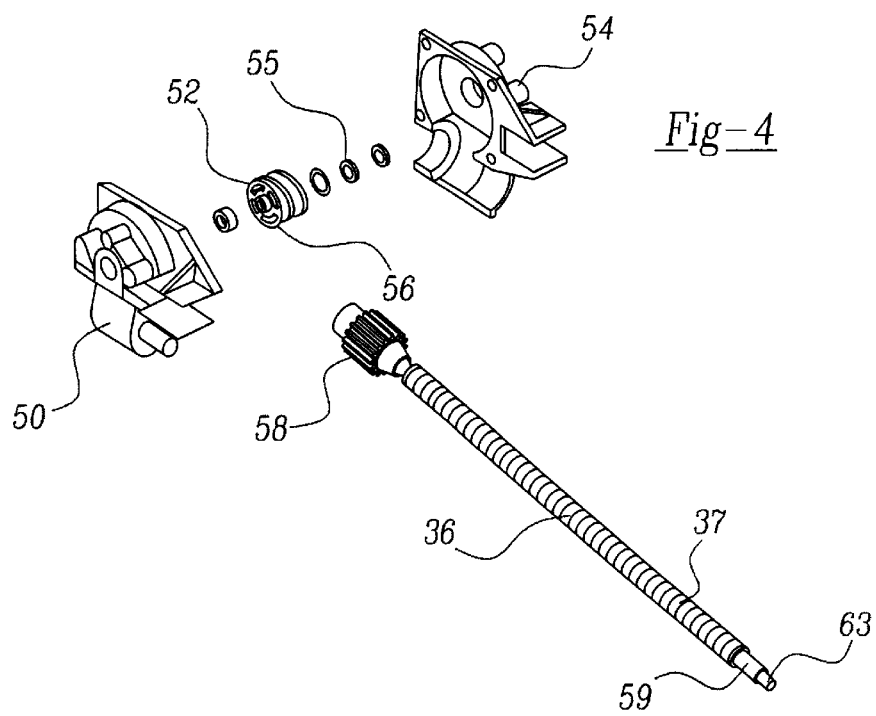
FIG. 4 is an exploded view of one side of a gearbox according to the present invention.

As shown in FIG. 4, the gearbox comprises a gear housing portion 50, having pins, not shown, which are received in openings a second gear housing 54. The gear housings are received around a worm gear 52. The housing pins are staked after assembly of the two housings. As shown, schematically, a cable 55 drives the worm gear 52 for rotation. Teeth 56 on the outer face of the worm gear 52 engage and drive a gear 58. Gear 58 drives the lead screw 36. An end 59 of the lead screw 36 receives the bracket 42 and associated washer on the end of lead screw 36. The very end 63 is then spun riveted to secure the bracket and washer on the lead screw 36.

Figure 5:
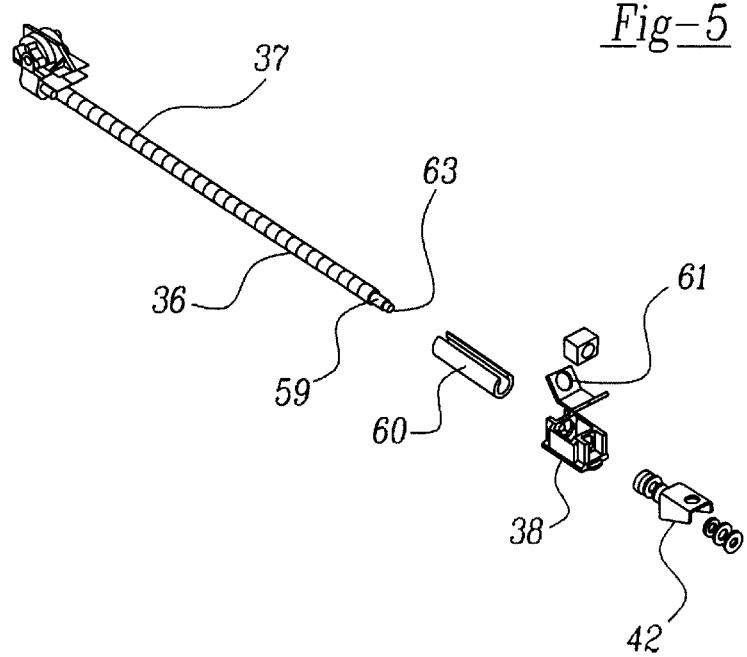
FIG. 5 is an exploded view of one of the lead screw arrangements of the present invention.

As shown in FIG. 5, the lead screw 36 receives the stop 60, and the nut retainer 38. The nut retainer 38 is provided with bolt openings 61 for being secured to the lower track 30. The end retainer bracket 42 is secured to portion 59, and portion 59 is then spun riveted to the bracket.

Figure 6A:
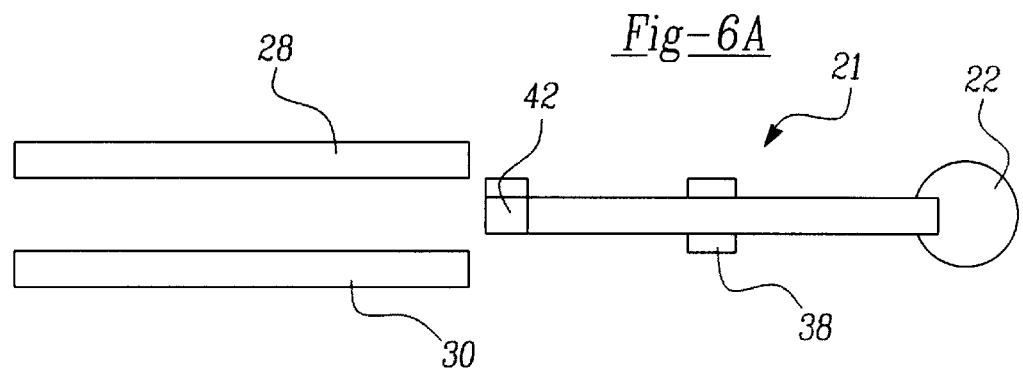
FIG. 6A schematically shows a first step in the attachment of the inventive assembly.
Figure 6B:
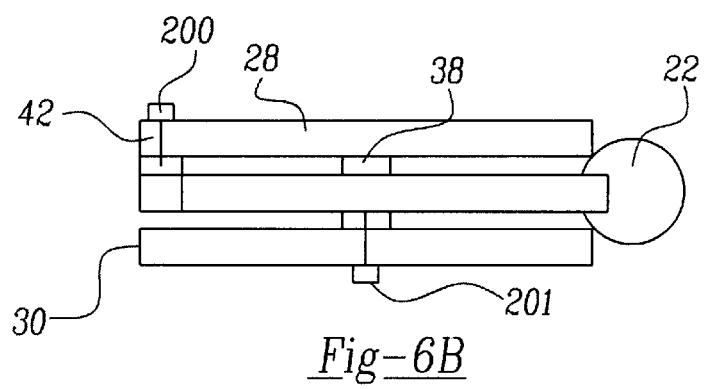
FIG. 6B shows a subsequent step.

FIGS. 6A and 6B show the attachment of the modular assembly 21 to the remainder of the seat adjustment assembly. As shown, modular assembly 21, including nut 38 and bracket 42 is slid, as a combined unit as shown in FIG. 2, into both spaced track sets. The lead screws are slid between the upper 28 and lower 30 tracks. The brackets 34 snap onto rod 32 (FIG. 1).

Once the assembly is complete, one or more bolts 200 secure bracket 42 to upper track 28. Similarly, screws 201 secure nut 38 to lower track 30.

The overall assembly allows the modular construction of the various components, and thus simplifies the assembly of a seat adjustment structure. Moreover, there are less attachment members necessary with this invention.

Preferred embodiments of this invention have been disclosed, however, a worker of ordinary skill in this art would recognize that certain modifications come within the scope of this invention. For that reason, the following claims should be studied to determine the true scope and content of this invention.

I claim:

1. A seat adjustment assembly including:

a pair of spaced upper tracks to be fixed to a seat;

a pair of spaced lower tracks to be fixed to a vehicle, said upper tracks engaged on said lower tracks for relative movement;

an adjustment assembly for driving said upper tracks relative to said lower tracks, said assembly including a single motor spaced between said two upper and lower tracks, and having cable drives extending to gears associated with each of said two upper tracks, said gears driving a lead screw arrangement associated with each of said two upper tracks, and said lead screw arrangements being operable to drive said upper tracks relative to said lower tracks;

said gear for driving a lead screw, a nut being received on said lower tracks, and said lead screws being fixed to said upper tracks, said cable drives being received within cable housings, said cable housings snapping to said motor; and said motor having at least one bracket which snaps onto a supporting seat structure, said brackets received onto a crossing rod, which is a portion of a vertical lift mechanism for said motor.

2. An assembly as recited in claim 1, wherein there are a pair of said brackets, with one of said brackets at each end of said motor.

3. An assembly as recited in claim 1, wherein a bracket is secured to an end of said lead screw, said bracket being secured to said upper track.

4. An assembly as recited in claim 1, wherein said gear housings include a pair of housing members secured around a gear member, said gear member being driven by said cable drive, and said housing members staked together after assembly to enclose said gear.

5. An assembly as recited in claim 1, wherein said gears include a worm gear engaging a gear at an outer periphery of said lead screw, said worm gear driving said gear to in turn rotate said lead screw.

6. A seat adjustment assembly including:

a pair of spaced upper tracks to be fixed to a seat;

a pair of spaced lower tracks to be fixed to a vehicle, said upper tracks engaged on said lower tracks for relative movement;

an adjustment assembly for driving said upper tracks relative to said lower tracks, said assembly including a motor to be mounted on said seat, and spaced between said two upper tracks, said motor driving cable drives extending to gear housings associated with each of said two upper tracks, said gears having a worm gear arrangement arranging a gear at the outer periphery of a lead screw, said gear at said outer periphery of said lead screws driving said lead screws, said lead screws being fixed to said upper tracks;

a nut received in said lead screws, said nuts being fixed to said lower tracks, and said nuts having internal threads on external threads on said lead screws, such that upon rotation of said lead screws, said lead screws rotate within said nuts, and said nuts move axially relative to said lead screws, said lead screw, and said upper tracks then moving axially relative to said nuts; and said cable drives received within cable housings, said cable housings snapping to said motor, said motor having a pair of brackets which snap onto a supporting seat structure, a bracket secured to an end of said lead screw, said bracket being secured to said upper track, said gear housings include a pair of housing members secured around a gear member, said gear member being driven by said cable drive, and said housing members are staked together to enclose said gear.

7. A method of assembling an adjustment structure to a seat for moving said seat forwardly and rearwardly within the cab of a vehicle comprising the steps of:

1) providing a seat assembly having a pair of spaced lower and upper tracks, said lower tracks being fixed to the vehicle, and said upper tracks being fixed to a seat, there being an adjustment assembly for adjusting the position of the seat vertically, upwardly, and downwardly;

2) providing an assembly for moving said seat forwardly and rearwardly within the vehicle by sliding said upper track on said lower tracks; and
3) attaching said adjustment assembly to said remainder of said adjustment assembly as a unit, by inserting drive structures between said upper and lower tracks, and then securing said drive structure to said upper and lower tracks.

* * * * *